United States Patent
Heung

[11] Patent Number: 5,958,098
[45] Date of Patent: Sep. 28, 1999

[54] METHOD AND COMPOSITION IN WHICH METAL HYDRIDE PARTICLES ARE EMBEDDED IN A SILICA NETWORK

[75] Inventor: Leung K. Heung, Aiken, S.C.

[73] Assignee: Westinghouse Savannah River Company, Aiken, S.C.

[21] Appl. No.: 08/946,506

[22] Filed: Oct. 7, 1997

[51] Int. Cl.$^6$ .................................................. B01D 53/04
[52] U.S. Cl. .......................... 55/523; 55/524; 55/DIG. 5; 95/56; 95/127
[58] Field of Search ................... 95/55, 56, 127; 96/4, 153; 55/522, 524, DIG. 5, 523

[56] References Cited

U.S. PATENT DOCUMENTS

| | | | |
|---|---|---|---|
| 2,824,620 | 2/1958 | deRosset | 95/56 |
| 3,545,622 | 12/1970 | Sakhnovsky et al. | 96/153 X |
| 3,793,435 | 2/1974 | Reilly et al. | 423/248 |
| 3,825,418 | 7/1974 | Reilly et al. | 75/159 |
| 4,036,944 | 7/1977 | Blytas | 423/648 R |
| 4,108,605 | 8/1978 | Billings | 423/248 X |
| 4,482,360 | 11/1984 | Taketomo et al. | 95/56 X |
| 5,124,500 | 6/1992 | Clark et al. | 585/655 |
| 5,194,414 | 3/1993 | Kuma | 55/524 X |
| 5,215,729 | 6/1993 | Buxbaum | 423/248 |
| 5,292,801 | 3/1994 | Avnir et al. | 525/54.1 |
| 5,443,616 | 8/1995 | Congdon | 75/240 |
| 5,451,386 | 9/1995 | Collins et al. | 423/237 |
| 5,453,298 | 9/1995 | Gavalas et al. | 95/55 X |
| 5,456,740 | 10/1995 | Snow et al. | 55/524 X |
| 5,782,959 | 7/1998 | Yang et al. | 95/56 X |

FOREIGN PATENT DOCUMENTS

| | | | |
|---|---|---|---|
| 63-295402 | 12/1988 | Japan | 95/56 |

*Primary Examiner*—Robert Spitzer
*Attorney, Agent, or Firm*—Dority & Manning

[57] ABSTRACT

A silica embedded metal hydride composition and a method for making such a composition. The composition is made via the following process: A quantity of fumed silica is blended with water to make a paste. After adding metal hydride particles, the paste is dried to form a solid. According to one embodiment of the invention, the solid is ground into granules for use of the product in hydrogen storage. Alternatively, the paste can be molded into plates or cylinders and then dried for use of the product as a hydrogen filter. Where mechanical strength is required, the paste can be impregnated in a porous substrate or wire network.

28 Claims, No Drawings

METHOD AND COMPOSITION IN WHICH METAL HYDRIDE PARTICLES ARE EMBEDDED IN A SILICA NETWORK

GOVERNMENT RIGHTS

The United States Government has rights in this invention pursuant to Contract No. DE-AC09-89SR18035 between the United States Department of Energy and Westinghouse Savannah River Company.

BACKGROUND OF THE INVENTION

1. Field of the Invention

The invention relates generally to the field of metals and metal alloys that can react with hydrogen to form metal hydrides.

2. Description of Related Art

Metals and metal alloys that are capable of reacting with hydrogen to form a hydride are known as hydride formers or simply metal hydrides. Examples of hydride formers include most elemental metals and their associated alloys. Many of these materials have found applications in hydrogen storage, hydrogen recovery from gas mixtures and energy conversion systems. Unfortunately, these materials suffer from two significant disadvantages:

First, when these metals and alloys react with hydrogen repeatedly, they crack into pieces or break into particles as small as fractions of a micron known as "fines." If they are used as membranes or filters separating hydrogen from other gases, such breaking will cause the filter to fail. If they are used in packed columns or beds for hydrogen storage or absorption, such breaking can cause excessive resistance to gas flow or even a blockage.

A second disadvantage to hydride formers is that they are often sensitive to poisons like carbon monoxide and sulfur compounds and to reactive gases like oxygen. Commercial hydrogen streams contain small amounts of these impurities that prevent the application of metal hydrides in those areas.

The prior art is replete with inventions using metal hydrides to filter hydrogen from a diverse gaseous stream. For example, U.S. Pat. No. 3,793,435 to Reilly et al. teaches the use of lanthanum alloy hydrides for separation of hydrogen from other gases. U.S. Pat. No. 4,108,605 teaches the use of metal hydrides to adsorb hydrogen and impurities from a gaseous stream and then through temperature manipulation to release the hydrogen while retaining the impurities.

While these inventions are useful in purifying hydrogen streams, they still suffer from the physical integrity and impurity sensitivity drawbacks discussed above. Thus, there is room in the art for improvements directed towards improving the dimensional stability and resistance to impurities of metal hydrides.

SUMMARY OF THE INVENTION

One object of the present invention is to provide a method for embedding metal hydride particles in a network of silica particles.

Another object is that the method produce a silica embedded metal hydride that is dimensionally stable.

A further object is that the method produce a silica embedded metal hydride that is resistant to poisons and impurities.

Yet another object is to provide a composition for separating hydrogen from a diverse stream of gases such as $H_2$, $N_2$, Methane, Ethane, $CO_2$, CO and $H_2S$.

Still another object is that the composition resist breaking into fines and that any fines that are produced be held in the silica network.

According to the present invention, the foregoing and other objects and advantages are attained by a silica embedded metal hydride composition and a method for making such a composition. The composition is made via the following process: A quantity of fumed silica is blended with water to make a paste. After adding metal hydride particles, the paste is dried to form a solid.

In accordance with one aspect of the invention, the solid is ground into granules for use of the product in hydrogen storage and separation.

In accordance with another aspect of the invention, the paste is molded into plates or cylinders and then dried for use of the product as a hydrogen filter.

In accordance with yet another aspect of the invention, the paste is impregnated in a porous substrate or wire network for applications where mechanical strength is required.

In accordance with a further aspect of the invention, a liquid that is non-soluble in water is added to the paste to enhance the processing of the composition.

In accordance with a still further aspect of the invention, the composition is heat treated to adjust its porosity and mechanical strength.

Additional objects and advantages will become apparent from a consideration of the following description.

DETAILED DESCRIPTION

According to a preferred embodiment of the present invention, a silica embedded metal hydride composition comprises a porous network of small, amorphous fumed silica particles into which metal hydride particles are embedded. The composition is dimensionally stable and is resistant to oxygen, poisons and reactive impurities. A method for making the composition that achieves all the various objects of the present invention will now be described.

The process begins by providing a pre-determined amount of amorphous fumed silica. This substance is high purity silicon oxide ($SiO_2$) and is commercially available, such as CAB-O-Sil® grade EH-5 from CABOT Corporation. Fumed silica is formed by burning silicon tetrachloride vapor in a flame of hydrogen and oxygen.

The fumed silica is then blended into water to form a paste via a polymerization process. The weight ratio of water to fumed silica can range from 3:1 to 9:1. Metal hydride particles are added to the paste to be embedded into the silica network. The weight ratio of the metal hydride particles to the fumed silica in the paste ranges from 0.18:1 to 2.3:1. In practice, the metal hydride typically comprises 15% to 70% of the finished product by weight. Preferably, the metal hydride particles have sizes ranging from 0.5 $\mu$m to 100 $\mu$m, and most preferably, the particles are smaller than 50 $\mu$m. Examples of hydrides that can be used in the composition include pure hydrides such as Pd and more complex alloys of Pd, Ti, La, Ni, Zr, Co and Al. U.S. Pat. No. 5,443,616 to Congdon describes a method for producing metal hydrides in the form of fine particles suitable for use in the instant invention and is incorporated herein by reference.

According to one embodiment of the invention, the paste is then allowed to dry to form a solid. The simplest method for drying the paste is to allow it to air dry. However, using heat and/or vacuum drying techniques may provide additional beneficial properties. Next, the solid composition is ground up using a commercial grinder, grain mill or simply a mortar and pestle. Typically the ground up solid is filtered through a sieve to collect granules of a desired size for packing into columns or beds commonly used in hydrogen storage or separations systems.

If desired, the ground up solid can be added back into a new paste of fumed silica and then dried and ground up to form a composition having a double layer of silica with metal hydride particles embedded in the layers. It should be obvious to one skilled in the art that this process can be repeated to generate a composition having multiple silica layers.

Alternatively, the paste can be poured into a mold and then dried using the techniques discussed above to form plates, cylinders, or other desired forms for use in filtering hydrogen from other gases.

For applications where mechanical strength is critical, the paste can be impregnated in a porous substrate or wire network and once again dried using the techniques discussed above. Advantageously, the paste is quite versatile and is readily adaptable for use in a variety of applications.

According to another embodiment of the invention, greater resistance to oxygen and other impurities, a liquid that is non-soluble in water can be added to the paste. Examples of such liquids include common paint thinner and mineral oil spirit type 11, grade A. The non-soluble liquid has the effect of breaking down the paste into particulates that can then be dried using the techniques discussed above. The following steps describe one specific embodiment of the invention incorporating the non-soluble liquid:

First, acquire 85 grams of fumed silica, 33 grams of $LaNi_{4.25}Al_{0.75}$ powder (metal hydride) having a particle size $\leq 45$ $\mu$m and 351 grams of deionized water. The water is then placed in a blender at median speed. Add the fumed silica and the metal hydride to the water gradually until the entire amount is added and a uniform paste is formed. Switch the blender to low speed and pour into the paste 170 cc of paint thinner (non-soluble liquid). Continue blending until the paste is broken into particulates. The particulates can then be removed from the blender and dried using the techniques discussed above. In addition, the particulates can be ground up and run through a sieve to collect a preferred granule size for the final product.

If desired, the final product based on the embodiments discussed above can be heat treated in the presence of an inert noble gas such as He or Ar to adjust the porosity or mechanical strength of the composition. This heat treating process is known as sintering.

In the final product, the silica particles form a porous network via polymerization of the silica molecules at contacting points. The size of the pores in the network is typically between 1 and 100 nanometers. In contrast, the metal hydride particles are only 0.5 $\mu$m (fines) to 100 $\mu$m large. Since the metal hydride particles are 5 to 1000 times larger than the silica pores, the metal hydride particles are easily retained in the network. When the product is exposed to a gas mixture containing hydrogen and other gases or undesirable impurities, the hydrogen is able to pass freely through the pores of the network because of its small molecular size. Conversely, the larger molecules of the other gases or impurities are filtered by the silica network from reaching the metal hydride particles held therein. Thus, the product can be freely exposed to the atmosphere without fear of oxidizing the embedded metal hydride. Experiments have revealed that the product can even filter CO molecules with some degree of success. In addition to acting as a filter, the silica network also provides dimensional stability to the metal hydrides to curb their tendency to break into fines after repeated exposure to hydrogen. Although the silica network cannot prevent the formation of fines entirely, any fines that are produced are held within the network and prevented from finding their way into the hydrogen storage equipment causing resistance to gas flow or even plugging up the system. Additional details and comparisons are set forth in Table 1.

TABLE 1

|  | Particle Size change after repeated hydrogen absorption | Hydrogen absorption after exposure to air | In the presence of 10% CO in hydrogen |
| --- | --- | --- | --- |
| Pure metal hydride ($LaNi_{4.25}Al_{0.75}$) | Ranges from original size down to micron range | Does not absorb hydrogen for 20 minutes, then only slowly after 20 minutes | Does not absorb hydrogen |
| Composition of the invention (metal hydride embedded in fumed silica) | No change in size | Absorbs hydrogen immediately | Absorbs hydrogen to 70% of original capacity |

The above description is given in reference to a silica embedded metal hydride composition and method for making same. However, it is understood that many variations are apparent to one of ordinary skill in the art from a reading of the above specification and such variations are within the spirit and scope of the invention as defined by the following appended claims:

That which is claimed:

1. A composition for separating hydrogen from a diverse gaseous stream, comprising:

a network of silica particles, said network having a plurality of pores;

metal hydride particles disposed throughout said network, said metal hydride particles being larger than the size of said pores;

whereby said metal hydride particles are substantially retained by said network after repeated exposure of said metal hydride particles to hydrogen.

2. The composition of claim 1, wherein said pores have diametric lengths ranging from 1 nanometer to 100 nanometers.

3. The composition of claim 1, wherein said metal hydride particles have diametric lengths ranging from 0.5 $\mu$m to 100 $\mu$m.

4. The composition of claim 1, wherein within said network of silica particles, individual silica molecules are interconnected by polymerization.

5. A silica embedded metal hydride composition, said composition made by a process comprising the steps of:

blending fumed silica into water to make a first paste;

adding metal hydride particles to said first paste to make a second paste; and drying said second paste to form a solid.

6. The composition of claim 5, wherein said process further comprises the steps of:

grinding said solid into granules; and filtering said granules through a sieve to collect granules of a desired size.

7. The composition according to claim 5, comprising the additional step of molding said second paste into a desired form.

8. The composition of claim 7, wherein said desired form is selected from the group consisting of plates and cylinders.

9. The composition of claim 5, wherein said process comprises the additional step of impregnating said second paste into a porous substrate prior to said drying step.

10. The composition according to claim 5, wherein said step of adding metal hydride particles to said first paste to make a second paste further comprises the additional step of blending a liquid that is non-soluble in water into the first paste containing metal hydride particles, thereby providing a second paste having a plurality of particulates.

11. The composition of claim 10, wherein said liquid that is non-soluble in water is selected from the group consisting of paint thinner and mineral oil spirit type 11, grade A.

12. The composition according to claim 5, wherein said process comprises the additional step of heat treating said solid.

13. The composition of claim 5, wherein said metal hydride particles have diametric lengths less than 50 $\mu$m.

14. The composition of claim 5, wherein the weight ratio between said water and said fumed silica in said first paste is $\geq$3:1 and $\leq$9:1.

15. The composition of claim 5, wherein the weight ratio between said metal hydride particles and said fumed silica in the first paste $\geq$0.18:1 and $\leq$2.3:1.

16. The composition according to claim 5, wherein in said process comprises the additional step of impregnating said second paste into a wire network prior to said drying step.

17. A method for embedding metal hydride particles in a network of silica particles, comprising the following steps:

blending fumed silica into water to make a first paste;

adding metal hydride particles to said first paste to make a second paste; and drying said second paste to form a solid.

18. The method of claim 17, further comprising the steps of:

grinding said solid into granules; and filtering said granules through a sieve to collect granules of a desired size.

19. The method according to claim 1, wherein said step of drying said second paste to form a solid further comprises molding said second paste into a desired form.

20. The method of claim 19, wherein said desired form is selected from the group consisting of plates and cylinders.

21. The method according to claim 17, comprising the additional step of impregnating said second paste into a porous substrate.

22. The method of claim 17, wherein said metal hydride particles have diametric lengths less than 50 $\mu$m.

23. The method of claim 17, wherein the weight ratio between said water and said fumed silica in said first paste is $\geq$3:1 and $\leq$9:1.

24. The method of claim 17, wherein the weight ratio between said metal hydride particles and said fumed silica in the first paste $\geq$0.18:1 and $\leq$2.3:1.

25. The method according to claim 17, wherein said second paste is attached to a wire network prior to said drying step.

26. A method for embedding metal hydride particles in a network of silica particles, comprising the following steps:

blending a fumed silica into water to make a first paste;

adding metal hydride particles to said first paste to make a metal hydride paste;

blending a liquid that is non-soluble in water into said metal hydride paste, thereby forming a plurality of particulates within said metal hydride paste; and drying said metal hydride paste to form a solid.

27. The method according to claim 26 wherein said liquid that is non-soluble in water is selected from the group consisting of paint thinners and mineral oil spirits.

28. The method according to claim 26, comprising the additional step of heat treating said solid in the presence of an inert gas to adjust the porosity and mechanical strength of the solid.

* * * * *

UNITED STATES PATENT AND TRADEMARK OFFICE
CERTIFICATE OF CORRECTION

PATENT NO : 5,958,098
DATED : September 28, 1999
INVENTOR(S): Heung

It is certified that error appears in the above-identified patent and that said Letters Patent are hereby corrected as shown below:

In Column 6, Line 1, please change "claim 1" to --claim 17--.

Signed and Sealed this

Twenty-fifth Day of April, 2000

Attest:

Q. TODD DICKINSON

*Attesting Officer*      *Director of Patents and Trademarks*